(12) United States Patent
Collares et al.

(10) Patent No.: US 12,377,995 B2
(45) Date of Patent: Aug. 5, 2025

(54) AIRCRAFT TAIL MOUNTED FUEL CELL POWER TRAIN AND THERMAL MANAGEMENT SYSTEMS

(71) Applicant: EMBRAER S.A., São José dos Campos (BR)

(72) Inventors: Rodolfo Da Silva Collares, São José dos Campos (BR); Rui Mitio Katsutani, São José dos Campos (BR); Luiz Fernando Tedeschi Oliveira, São José dos Campos (BR); Carlos Henrique Belloni Mourão, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 35 days.

(21) Appl. No.: 18/505,642

(22) Filed: Nov. 9, 2023

(65) Prior Publication Data

US 2024/0166360 A1 May 23, 2024

Related U.S. Application Data

(60) Provisional application No. 63/427,232, filed on Nov. 22, 2022.

(51) Int. Cl.
*B64D 27/24* (2024.01)
*B64D 37/30* (2006.01)
*H01M 8/2465* (2016.01)

(52) U.S. Cl.
CPC ............. *B64D 27/24* (2013.01); *B64D 37/30* (2013.01); *H01M 8/2465* (2013.01); *H01M 2250/20* (2013.01)

(58) Field of Classification Search
CPC .. B64D 27/24; B64D 37/30; B64D 2041/005; H01M 8/2465; H01M 2250/20; Y02T 90/40
See application file for complete search history.

(56) References Cited

U.S. PATENT DOCUMENTS

| | | | | |
|---|---|---|---|---|
| 2,562,491 A | * | 7/1951 | Hall | B64C 37/00 244/50 |
| 3,065,927 A | * | 11/1962 | Mills | B64C 37/00 244/2 |
| 3,138,351 A | * | 6/1964 | Zuck | B64C 3/56 244/49 |
| 4,627,585 A | * | 12/1986 | Einstein | B60F 5/02 244/49 |

(Continued)

*Primary Examiner* — Medhat Badawi
(74) *Attorney, Agent, or Firm* — Nixon & Vanderhye, P.C.

(57) ABSTRACT

Fuel cell and power train (FCPT) systems are provided and adapted to being operatively mounted at a tail section of an aircraft fuselage. The FCPT systems will include port and starboard subsystems each being comprised of a nacelle adapted to being laterally attached to a respective side of the tail section of the fuselage, an electric motor contained in the nacelle, a propeller assembly mounted to the nacelle and operatively connected to and adapted to be driven by the electric motor contained therein, and at least one fuel cell positioned in the tail section of the fuselage to supply electrical power to the electric motor contained in the nacelle. One or more hydrogen fuel tanks may be mounted within the tail section of the fuselage to provide a source of hydrogen gas ($H_2$) as fuel to the fuel cells.

23 Claims, 4 Drawing Sheets

(56) References Cited

U.S. PATENT DOCUMENTS

| | | | | |
|---|---|---|---|---|
| 5,106,035 | A * | 4/1992 | Langford, III | B64D 27/24 244/62 |
| 5,371,935 | A * | 12/1994 | Furs | B64D 37/02 29/402.03 |
| 5,893,535 | A * | 4/1999 | Hawley | B64C 3/00 244/119 |
| 5,909,858 | A * | 6/1999 | Hawley | B64C 3/00 244/45 R |
| 6,347,719 | B1 * | 2/2002 | Rosen | B64D 37/30 220/586 |
| 6,568,632 | B2 * | 5/2003 | Page | B64U 10/20 244/36 |
| 6,568,633 | B2 * | 5/2003 | Dunn | B64D 35/022 244/59 |
| 6,572,053 | B2 * | 6/2003 | Salas | B60V 1/02 244/73 C |
| 6,604,706 | B1 * | 8/2003 | Bostan | B64U 50/14 244/6 |
| 6,666,406 | B2 * | 12/2003 | Sankrithi | B64C 39/04 244/119 |
| 6,877,690 | B1 * | 4/2005 | Bragg | B64C 37/00 244/219 |
| 6,923,403 | B1 * | 8/2005 | Dizdarevic | B64C 1/0009 244/36 |
| 7,093,798 | B2 * | 8/2006 | Whelan | B64C 1/065 244/120 |
| 7,559,389 | B2 * | 7/2009 | Yamashita | B60K 1/04 180/68.5 |
| 8,353,478 | B1 * | 1/2013 | Kismarton | B64C 9/38 244/119 |
| 8,607,909 | B2 * | 12/2013 | Ohashi | H01M 16/006 180/68.5 |
| 9,108,738 | B1 * | 8/2015 | Tweet | B64D 37/14 |
| 9,422,139 | B1 * | 8/2016 | Bialkowski | B66C 13/06 |
| 9,493,246 | B2 * | 11/2016 | Barmichev | B64D 37/04 |
| 9,676,481 | B1 * | 6/2017 | Buchmueller | G05D 1/0094 |
| 10,023,312 | B2 * | 7/2018 | Repp | H04N 23/63 |
| 10,071,804 | B1 * | 9/2018 | Buchmueller | B64U 50/19 |
| 10,227,129 | B2 * | 3/2019 | Fisher | B64C 5/06 |
| 10,414,484 | B2 * | 9/2019 | Moxon | B64C 3/52 |
| 10,519,013 | B2 * | 12/2019 | Curran | B66D 1/741 |
| D875,183 | S * | 2/2020 | Alonso | D21/445 |
| 10,773,817 | B1 * | 9/2020 | Brennen | B64D 33/02 |
| 10,807,013 | B2 * | 10/2020 | Alonso | B64C 31/06 |
| 10,946,962 | B2 * | 3/2021 | Banerjee | B64C 3/14 |
| 11,179,989 | B2 * | 11/2021 | Che | B60F 5/02 |
| 11,209,836 | B1 * | 12/2021 | Sikora | G05D 1/101 |
| 11,524,778 | B2 * | 12/2022 | Saias | B64D 35/024 |
| 11,565,607 | B2 * | 1/2023 | Mikic | B64D 27/31 |
| 11,613,356 | B2 * | 3/2023 | Banerjee | B64C 1/0009 244/36 |
| 11,634,232 | B1 * | 4/2023 | Wiegman | B64D 31/18 244/53 R |
| 11,697,500 | B2 * | 7/2023 | Whitlock | B64C 39/10 244/119 |
| 11,752,899 | B2 * | 9/2023 | Mikic | H01M 8/04291 429/414 |
| D1,016,717 | S * | 3/2024 | Nakatani | D12/337 |
| 11,970,276 | B2 * | 4/2024 | Wiegman | B64C 29/0025 |
| 2003/0230671 | A1 * | 12/2003 | Dunn | B64D 27/357 244/53 R |
| 2004/0069897 | A1 * | 4/2004 | Corcoran | B64D 27/355 244/10 |
| 2004/0245382 | A1 * | 12/2004 | Nozaki | B64D 27/24 244/53 R |
| 2006/0219847 | A1 * | 10/2006 | Miller | B64C 23/00 244/130 |
| 2007/0026281 | A1 * | 2/2007 | Ueda | H01M 8/04029 429/513 |
| 2007/0237991 | A1 * | 10/2007 | Eichhorn | C22C 5/02 429/492 |
| 2008/0006743 | A1 * | 1/2008 | Miller | B64U 10/25 244/53 R |
| 2008/0230654 | A1 * | 9/2008 | Velicki | B64D 37/04 244/135 R |
| 2009/0212162 | A1 * | 8/2009 | Ward | B64D 37/04 244/135 R |
| 2010/0181414 | A1 * | 7/2010 | Lopez, Jr. | B64C 29/0033 244/12.4 |
| 2010/0187237 | A1 * | 7/2010 | Brooks | F17C 1/12 220/660 |
| 2014/0174083 | A1 * | 6/2014 | Gerstler | F17C 9/04 60/671 |
| 2014/0175215 | A1 * | 6/2014 | Gallant | B64F 1/30 244/36 |
| 2015/0007585 | A1 * | 1/2015 | Kawai | B64D 37/30 62/48.2 |
| 2015/0032176 | A1 * | 1/2015 | Mintchev | A61N 1/36007 607/40 |
| 2015/0040986 | A1 * | 2/2015 | Tichborne | H01M 8/04141 137/340 |
| 2015/0307201 | A1 * | 10/2015 | Criado | B64D 41/00 244/58 |
| 2016/0111885 | A1 * | 4/2016 | Roques | H01H 33/02 29/428 |
| 2016/0236790 | A1 * | 8/2016 | Knapp | B64C 11/001 |
| 2017/0021760 | A1 * | 1/2017 | Calnek | B60Q 1/482 |
| 2017/0029131 | A1 * | 2/2017 | Steinwandel | B64U 30/10 |
| 2017/0081035 | A1 * | 3/2017 | Becker | B64D 29/00 |
| 2018/0001999 | A1 * | 1/2018 | Page | B64C 25/14 |
| 2018/0037327 | A1 * | 2/2018 | Hoffjann | B64D 41/00 |
| 2018/0114995 | A1 * | 4/2018 | Stoia | H01M 8/04225 |
| 2018/0178920 | A1 * | 6/2018 | Swann | B64D 27/24 |
| 2018/0291807 | A1 * | 10/2018 | Dalal | B64D 27/18 |
| 2018/0334254 | A1 * | 11/2018 | Saint-Marc | B64D 11/003 |
| 2019/0135424 | A1 * | 5/2019 | Baity | B64C 29/0033 |
| 2019/0300170 | A1 * | 10/2019 | Bousfield | B64C 37/00 |
| 2019/0322379 | A1 * | 10/2019 | Mackin | F02C 9/20 |
| 2019/0322382 | A1 * | 10/2019 | Mackin | B64D 31/18 |
| 2019/0323426 | A1 * | 10/2019 | Mackin | F02C 3/32 |
| 2019/0323427 | A1 * | 10/2019 | Mackin | B64D 27/10 |
| 2019/0344898 | A1 * | 11/2019 | Scothern | B64D 35/023 |
| 2019/0382123 | A1 * | 12/2019 | Schwarz | F02C 6/14 |
| 2020/0207471 | A1 * | 7/2020 | Yasuda | B64D 1/22 |
| 2020/0254900 | A1 * | 8/2020 | Kumar | H02P 5/74 |
| 2020/0290742 | A1 * | 9/2020 | Kumar | B64D 27/35 |
| 2020/0307789 | A1 * | 10/2020 | Princen | B64D 33/06 |
| 2020/0407060 | A1 * | 12/2020 | Hosseini | B64C 21/04 |
| 2021/0222629 | A1 * | 7/2021 | Terwilliger | B64D 31/18 |
| 2021/0254507 | A1 * | 8/2021 | Tejero Embuena | F01D 25/24 |
| 2021/0354816 | A1 * | 11/2021 | Oliveira | B64C 39/068 |
| 2022/0001974 | A1 * | 1/2022 | Page | B64C 25/04 |
| 2022/0009379 | A1 * | 1/2022 | Mikic | B64D 27/33 |
| 2022/0042465 | A1 * | 2/2022 | Swann | F02C 6/20 |
| 2022/0052361 | A1 * | 2/2022 | Morrison | H01M 8/04014 |
| 2022/0055762 | A1 * | 2/2022 | Clarke | H01M 8/04701 |
| 2022/0063819 | A1 * | 3/2022 | Murrow | B64D 27/31 |
| 2022/0131165 | A1 * | 4/2022 | Ballantine | H01M 8/04649 |
| 2022/0275733 | A1 * | 9/2022 | Hollingshead | B64D 33/02 |
| 2022/0388633 | A1 * | 12/2022 | Page | B64C 25/04 |
| 2023/0091919 | A1 * | 3/2023 | Stump | G06F 3/04847 715/735 |
| 2023/0091929 | A1 * | 3/2023 | Atreya | B64D 27/24 244/135 R |
| 2023/0092281 | A1 * | 3/2023 | Rawdon | B64C 17/10 244/135 C |
| 2023/0143459 | A1 * | 5/2023 | Clark | B64D 27/402 244/7 R |
| 2023/0348090 | A1 * | 11/2023 | O'Leary | B64D 37/30 |
| 2023/0375136 | A1 * | 11/2023 | Orchard | F17C 7/04 |
| 2024/0166356 | A1 * | 5/2024 | Da Silva Collares | B64D 13/06 |
| 2024/0166360 | A1 * | 5/2024 | Collares | B64D 27/24 |
| 2024/0217669 | A1 * | 7/2024 | Mikic | H01M 8/04067 |
| 2024/0239485 | A1 * | 7/2024 | Atreya | B64C 39/10 |
| 2024/0327023 | A1 * | 10/2024 | Czapla | B64D 27/18 |
| 2024/0343401 | A1 * | 10/2024 | Miftakhov | B64D 27/355 |
| 2024/0359812 | A1 * | 10/2024 | Evans | F02C 7/224 |

* cited by examiner

AIRCRAFT TAIL MOUNTED FUEL CELL POWER TRAIN AND THERMAL MANAGEMENT SYSTEMS

CROSS-REFERENCE TO RELATED APPLICATION

This application is based on and claims domestic priority benefits from U.S. Provisional Application Ser. No. 63/427,232 filed on Nov. 22, 2022, the entire content of which is expressly incorporated hereinto by reference.

FIELD

The embodiments disclosed herein relate generally to fuel cell systems. In especially preferred forms, the embodiments disclosed herein relate to fuel cell powered electrical power train systems especially useful for the aeronautics and aerospace industries.

BACKGROUND

With the exception of relatively small aircraft, the vast majority of airplanes in service today operate with thermal engines which combust fossil fuels. However, electric solutions to power aircraft combining an electrical motor to either battery energy or fuel cells are extensively being studied generating a number of scientific publications and the creation of demonstrator aircraft.

To date, however, it is believed that no consecrated installation and layout solutions for aircraft fuel cells in aircraft power train systems has been proposed. It is therefore providing such solutions that the embodiments disclosed herein are directed.

SUMMARY

Broadly, the embodiments disclosed herein are directed toward compact and space optimized layouts to accommodate fuel cells in a tail region of a multi-engine electric motor-driven propeller aircraft. The propellers may be in either a pusher configuration or a tractor configuration. In preferred embodiments, the fuel cell systems and remaining power train (e.g., electric motor and associated propellers) are employed to power a dual propeller aircraft.

According to preferred embodiments, a fuel cell and power train (FCPT) system is provided which is adapted to being operatively mounted at a tail section of an aircraft fuselage. The FCPT system will include port and starboard subsystems each being comprised of a nacelle adapted to being laterally attached to a respective side of the tail section of the fuselage, an electric motor contained in the nacelle, a propeller assembly mounted to the nacelle and operatively connected to and adapted to be driven by the electric motor contained therein, and at least one fuel cell positioned in the tail section of the fuselage to supply electrical power to the electric motor contained in the nacelle. One or more hydrogen fuel tanks may be mounted within the tail section of the fuselage to provide a source of hydrogen gas ($H_2$) as fuel to the fuel cells.

The port and starboard subsystems of the FCPT system according to some embodiments may further include first and second fuel cells positioned in the tail section of the aircraft. The first fuel cell may thus be operatively connected to a fuselage radiator heat exchanger positioned in the tail section of the aircraft, while the second fuel cell may be operatively connected to a nacelle radiator heat exchanger positioned in the nacelle.

The FCPT system may further comprise an empennage root-mounted air inlet duct to direct ram air to the fuselage radiator heat exchanger. The fuselage may have a tail section which includes a tail cone having a variable area nozzle assembly to allow air exiting the fuselage radiator heat exchanger to be discharge to an external aircraft environment. The nacelle may also comprise an air inlet to direct ram air to the nacelle radiator fuel heat exchanger and a variable area nozzle outlet to allow air discharged from the nacelle radiator heat exchanger to be discharged to an external aircraft environment. The variable area nozzle outlet of the nacelle may be annular.

According to some embodiments, each of the fuselage radiator heat exchanger and the nacelle radiator heat exchanger may include a respective fan operatively mounted in the tail section of the fuselage and the nacelle.

These and other aspects and advantages of the present invention will become clearer after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
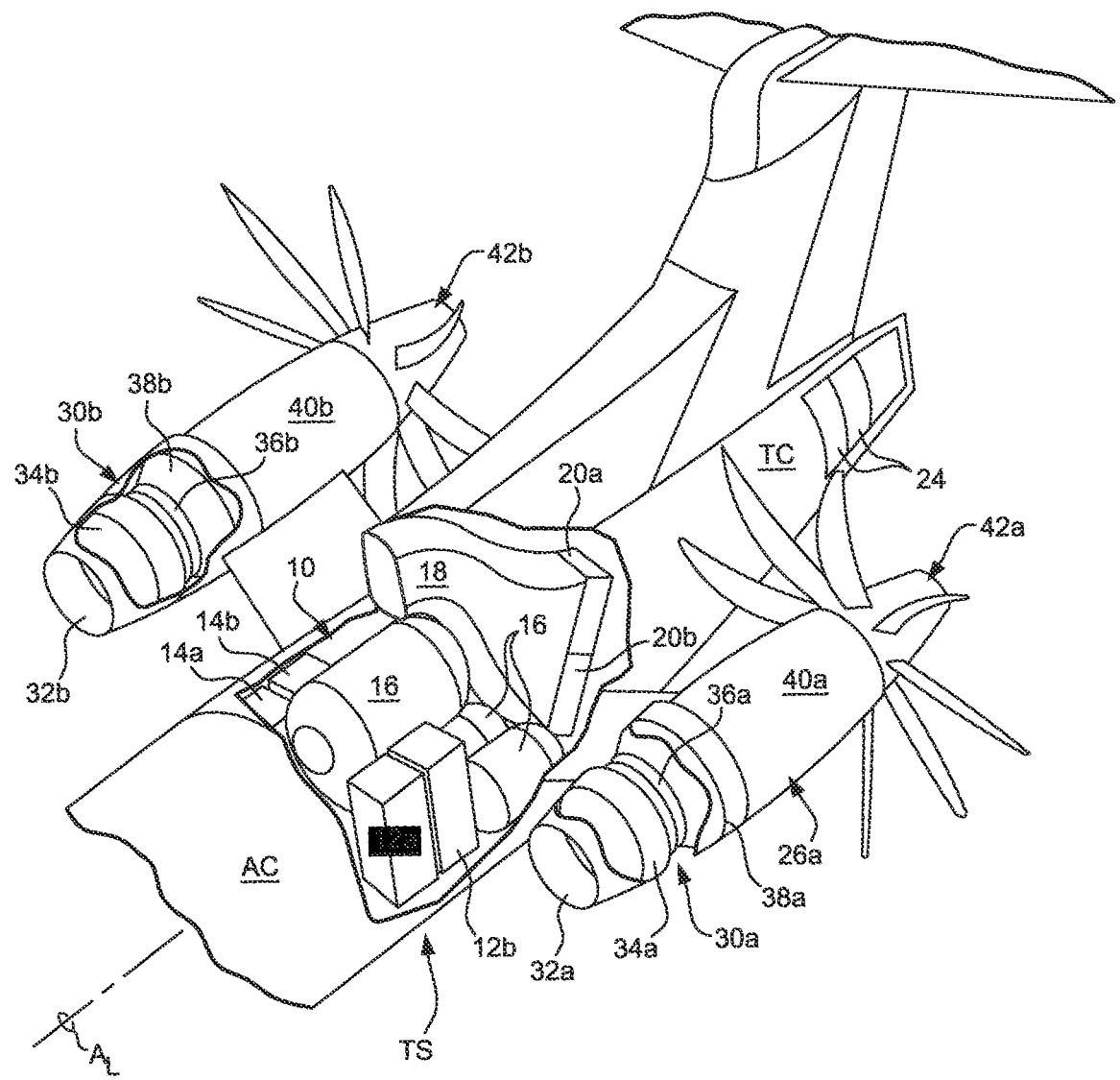
FIGS. 1 and 2 are respectively aft-looking and forward looking perspective views of an exemplary aircraft tail region that is partially sectioned to reveal an exemplary layout of a fuel cell power train and thermal management system in accordance with an embodiment of the present invention.
Figure 2:
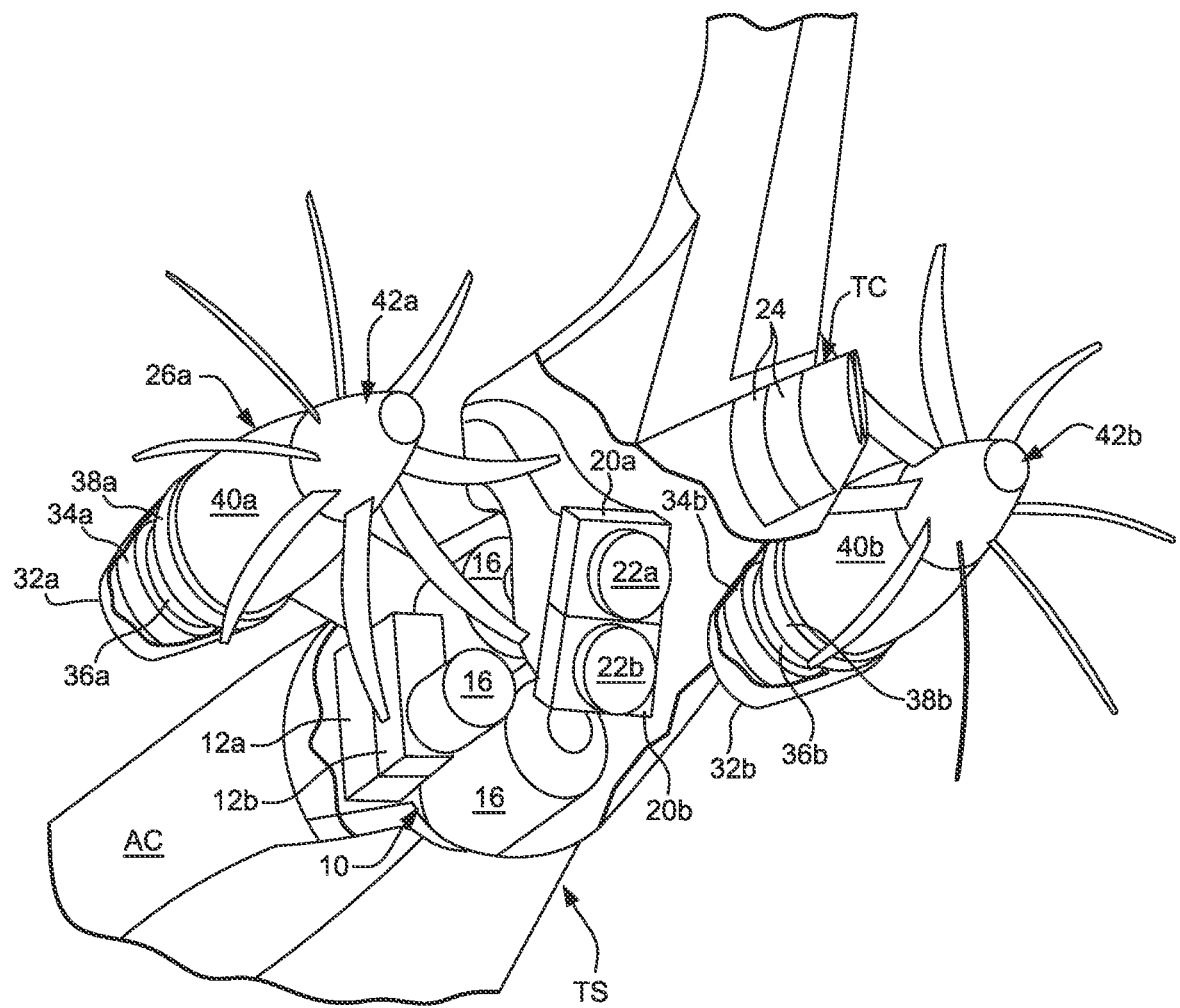

As is shown in FIGS. 1 and 2, a fuel cell and power train (FCPT) system 10 in accordance with an embodiment of the present invention is shown as being installed in the tail section TS of the aircraft AC. As shown, the FCPT system 10 includes respective port and starboard subsystems respectively including port and starboard pairs of fuel cells (FCs) 12a, 12b and 14a, 14b. A plurality of hydrogen ($H_2$) tanks 16 are positioned in the tail section TS of the fuselage and serve to store the hydrogen gas used as fuel for the fuel cells 12a, 12b, 14a, 14b. The fuel cells 12a, 12b, 14a, 14b are in and of themselves conventional fuel cells which generate electrical power by an electrochemical reaction from supplied hydrogen ($H_2$) fuel gas. See for example U.S. Pat. Nos. 7,559,389 and 8,607,909, the entire contents of which are expressly incorporated hereinto by reference. An empennage root-mounted air inlet duct 18 directs ambient inlet air to downstream radiator heat exchangers 20a, 20b equipped with fans 22a, 22b (see FIG. 2). The tail cone TC of the aircraft AC is provided with a variable area nozzle assembly 24 to allow air exiting the radiator heat exchangers 20a, 20b to be discharged to the external aircraft environment.

Port and starboard nacelles 26a, 26b are laterally mounted to the tail section TS in parallel alignment with the longitudinal axis $A_L$ of the aircraft AC and enclose a respective thermal management system 30a, 30b. Each of the thermal management systems 30a, 30b is respectively comprised of a frontal air inlet 32a, 32b, an interior nacelle radiator heat exchanger 34a, 34b, a fan 36a, 36b and a variable annular nozzle outlet 38a, 38b. The aft portion of the nacelles 26a, 26b also enclose a respective electric motor 40a, 40b and a pusher propeller assembly 42a, 42b operatively associated with the motor 40a, 40b, respectively.

Figure 3:
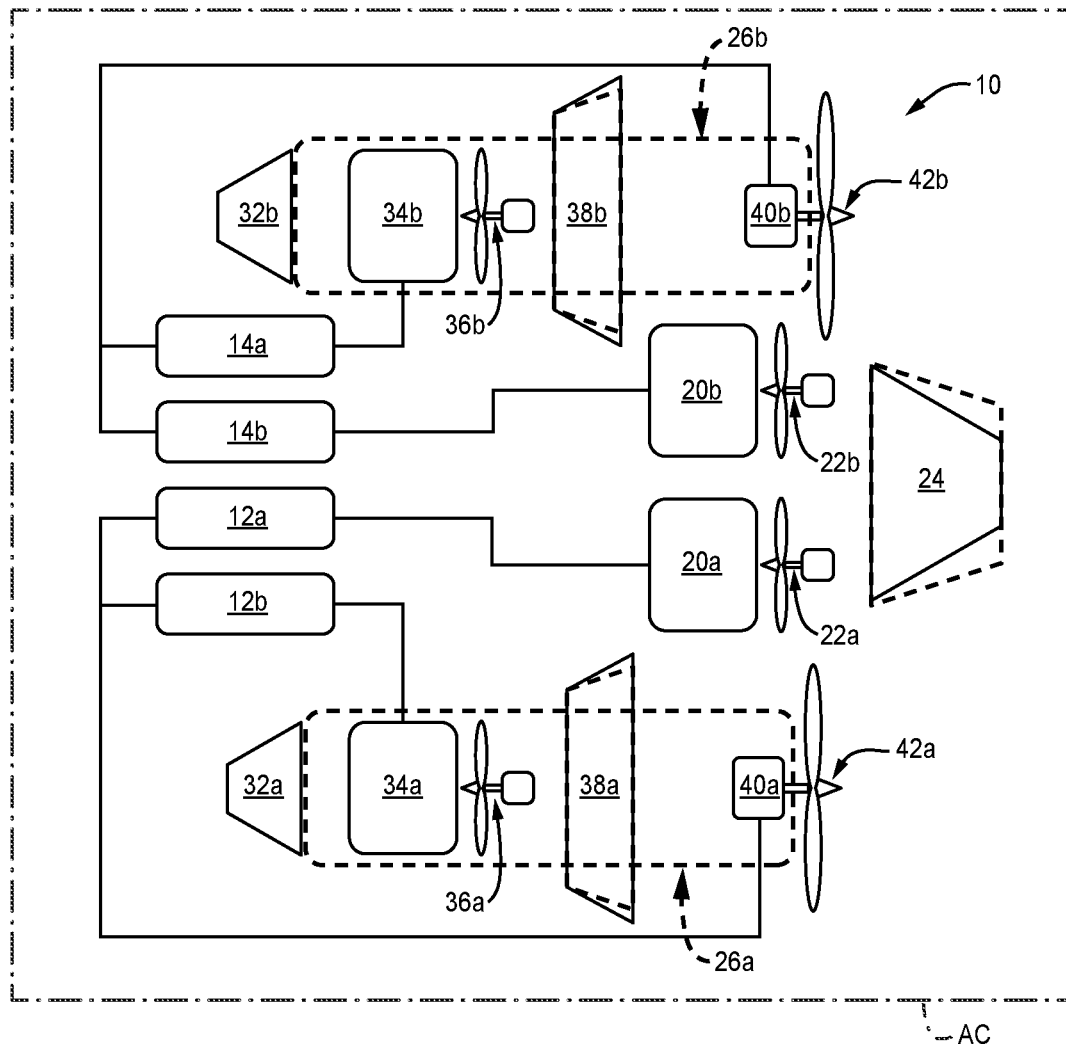
FIG. 3 is a schematic diagram showing the fuel cell power train and thermal management system of the embodiment depicted in FIGS. 1 and 2.

The operative interconnections for the FCPT system 10 are shown schematically in FIG. 3. As depicted therein, the aircraft AC is powered by the independent port and starboard pairs of fuel cells 12a, 12b and 14a, 14b, respectively, installed in the unpressurized tail section TS of the aircraft AC. Each of the port and starboard pairs of fuel cells 12a, 12b and 14a, 14b serve to provide electrical power the port and starboard electric engines 40a, 40b, respectively.

Each of port and starboard fuel cells 12a, 14a is independently provided with an operatively associated radiator heat exchanger 34a, 34b mounted in the nacelles 26a, 26b, respectively, while each of the port and starboard fuel cells 12b, 14b is independently provided with an operatively associated radiator heat exchanger 20a, 20b mounted in the tail section TS of the aircraft AC as shown in FIGS. 1 and 2.

The radiator heat exchangers, 20a, 20b mounted in the tail section TS of the aircraft AC perform air/liquid heat exchange with ram air provided by the empennage root-mounted air inlet duct 18 while the radiator heat exchangers 34a, 34b mounted in the nacelles 26a, 26b perform air/liquid heat exchange with ram air introduced through the frontal air inlets 32a, 32b, respectively. The variable area nozzles 24 provided in the tail cone TC of the aircraft AC and the variable area nozzles 38a, 38b modulate the ram air flow to the minimum required to achieve the designed heat exchange so as to minimize pressure losses.

The layout and arrangement of the FCPT system 10 as described above allows for the installation of a fuel cell based power train with great integration between heat management systems and power train components. The multiple fuel cells individual operatively associated radiator heat exchangers configuration (i.e., a pair of radiator heat exchangers on the nacelles and a pair of radiator heat exchangers inside tail section of the aircraft fuselage) allows installation of radiators with a relatively large frontal area with minimal impact on the slender profile of the aircraft. Further, pusher propellers create greater room for propeller installation since the propellers are installed in a relatively thinner portion of the tail section. The pusher propellers also generate less cabin noise as well due to their being further displaced in an aftwise direction relative to the pressurized cabin portion of the aircraft fuselage.

An alternative configuration for a FCPT system 10' having tractor propeller assemblies 42a', 42b' rather than the pusher propeller assemblies 42a, 42b as described previously is shown in FIG. 4. In this regard, common elements between the FCPT system 10' shown in FIG. 4 to those in the FCPT system 10 shown in FIG. 3 discussed above will be designated with the same reference numeral having a prime (') mark. It will be understood therefore that such components will have the same function in the FCPT system 10' as the function described in relation to the FCPT 10 and will therefore not be discussed in further detail.

Figure 4:
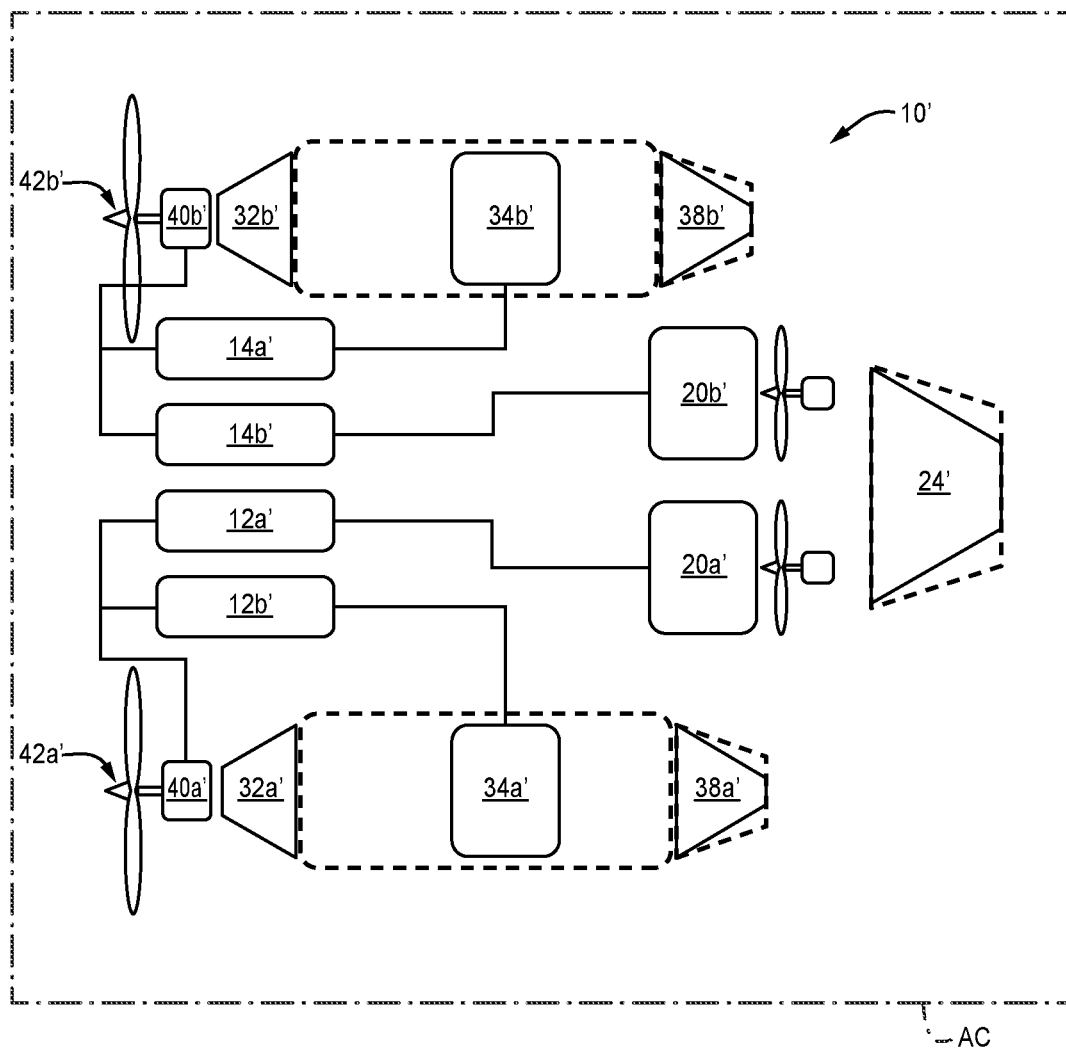
FIG. 4 is a schematic diagram showing the fuel cell power train and thermal management system according to another embodiment of the invention.

The FCPT system 10' shown in FIG. 4 has the advantage to dispense the radiator fans 36a, 36b mounted in the nacelles 26am 26b associated with the FCPT system 10 thereby taking advantage of the propeller stream dynamic pressure. However, having the propeller assemblies 42a', 42b' in forward-facing nacelle position can present more cabin noise and may present further installation restrictions due proximity to the aircraft fuselage.

While reference is made to particular embodiments of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A fuel cell and power train (FCPT) system operatively mountable at a tail section of an aircraft fuselage, wherein the FCPT system includes port and starboard subsystems, wherein each of the port and starboard subsystems comprises:
   (i) a nacelle adapted for lateral attachment to a respective port or starboard side of the tail section of the fuselage;
   (ii) an electric motor contained in the nacelle,
   (iii) a propeller assembly mounted to the nacelle and operatively connected to the electric motor contained in the nacelle so as to be driven thereby, and
   (iv) first and second fuel cells positioned in the tail section of the fuselage to supply electrical power to the electric motor contained in the nacelle, wherein
      the first fuel cell is operatively connected to a fuselage radiator heat exchanger positioned in the tail section of the aircraft, and wherein
      the second fuel cell is operatively connected to a nacelle radiator heat exchanger positioned in the nacelle.

2. The FCPT system according to claim 1, wherein the FCPT system further comprises at least one hydrogen gas fuel tank positionable within the tail section of the fuselage and operatively connected to the first and second fuel cells to provide the first and second fuel cells with a source of hydrogen gas.

3. The FCPT system according to claim 2, wherein FCPT system comprises a plurality of hydrogen gas fuel tanks.

4. The FCPT system according to claim 1, wherein the FCPT system further comprises an empennage root-mounted air inlet duct to direct ram air to the fuselage radiator heat exchanger.

5. The FCPT system according to claim 4, wherein the tail section of the fuselage includes a tail cone having a variable area nozzle assembly to allow air exiting the fuselage radiator heat exchanger to be discharge to an external aircraft environment.

6. The FCPT system according to claim 1, wherein the nacelle further comprises an air inlet to direct ram air to the nacelle radiator fuel heat exchanger.

7. The FCPT system according to claim 6, wherein the nacelle includes a variable area nozzle outlet to allow air discharged from the nacelle radiator heat exchanger to be discharged to an external aircraft environment.

8. The FCPT system according to claim 7, wherein the variable area nozzle outlet is annular.

9. The FCPT system according to claim 1, wherein each of the fuselage radiator heat exchanger and the nacelle radiator heat exchanger include a respective fan operatively mounted in the tail section of the fuselage and the nacelle.

10. The FCPT system according to claim 1, wherein the propeller assembly includes a pusher mounted propeller.

11. The FCPT system according to claim 1, wherein the propeller assembly includes a tractor mounted propeller.

12. A multi-engine electric motor-driven aircraft which comprises a fuselage and the FCPT system according to claim 1 operatively positioned at the tail section of the fuselage.

13. An aircraft comprising:
   a fuselage having a tail section and a fuselage radiator heat exchanger positioned in the tail section;
   at least one nacelle mounted at the tail section of the aircraft, the at least one nacelle including a nacelle radiator heat exchanger, a propeller assembly and an electric motor connected to the propeller assembly to drive the propeller assembly and thereby provide motive power to the aircraft; and
   a fuel cell and power train (FCPT) system which comprises first and second fuel cells positioned in the tail section of the fuselage to supply electrical power to the electric motor within the at least one nacelle, wherein
   (i) the first fuel cell is operatively connected to the fuselage radiator heat exchanger positioned in the tail section of the aircraft, and wherein
   (ii) the second fuel cell is operatively connected to the nacelle radiator heat exchanger positioned in the nacelle.

14. The aircraft according to claim 13, wherein the FCPT system further comprises at least one hydrogen gas fuel tank positioned within the tail section of the fuselage and operatively connected to the first and second fuel cells to provide the first and second fuel cells with a source of hydrogen gas.

15. The aircraft according to claim 14, wherein FCPT system comprises a plurality of hydrogen gas fuel tanks.

16. The aircraft according to claim 13, wherein the FCPT system further comprises an empennage root-mounted air inlet duct to direct ram air to the fuselage radiator heat exchanger.

17. The aircraft according to claim 16, wherein the tail section of the fuselage includes a tail cone having a variable area nozzle assembly to allow air exiting the fuselage radiator heat exchanger to be discharge to an external aircraft environment.

18. The aircraft according to claim 13, wherein the at least one nacelle further comprises an air inlet to direct ram air to the nacelle radiator fuel heat exchanger.

19. The aircraft according to claim 18, wherein the at least one nacelle includes a variable area nozzle outlet to allow air discharged from the nacelle radiator heat exchanger to be discharged to an external aircraft environment.

20. The aircraft according to claim 19, wherein the variable area nozzle outlet is annular.

21. The aircraft according to claim 13, wherein each of the fuselage radiator heat exchanger and the nacelle radiator heat exchanger include a respective fan operatively mounted in the tail section of the fuselage and the nacelle.

22. The aircraft according to claim 13, wherein the propeller assembly includes a pusher mounted propeller.

23. The aircraft according to claim 13, wherein the propeller assembly includes a tractor mounted propeller.

\* \* \* \* \*